UNITED STATES PATENT OFFICE.

JULIUS RÜTGERS, OF BERLIN, GERMANY.

WOOD-IMPREGNATING COMPOUND AND METHOD OF MAKING SAME.

SPECIFICATION forming part of Letters Patent No. 662,310, dated November 20, 1900.

Application filed May 22, 1900. Serial No. 17,590. (No specimens.)

*To all whom it may concern:*

Be it known that I, JULIUS RÜTGERS, a subject of the Emperor of Germany, residing at 134 Kurfürstenstrasse, Berlin, Germany, have invented certain new and useful Improvements in the Manufacture of Tar-Oil Solutions or Emulsions Suitable for Impregnating Wood, of which the following is a full and exact specification.

Among the materials hitherto proposed and used for the impregnation of wood tar-oil has been found to be by far the most suitable; but the limited quantity of tar-oil available has been a great obstacle to its exclusive use for the said purpose, inasmuch as its scarcity tends to raise the price and render its application in many cases prohibitive. Consequently a process for diluting or spreading the tar-oil without reducing its useful effect would have special interest for the impregnation of wood. A further advantage of such a dilution lies in the fact that it enables the manufacturer to apply exactly the quantity of oil which is required or prescribed for the impregnation. Such a tar-oil solution, which for the purpose of impregnation is by no means inferior to the same quantity of undiluted tar-oil, may be obtained by using as a solvent for the tar-oil the product resulting from the treatment of resin-oil with concentrated sulfuric acid. A solution of tar-oil in the acids obtained from resin-oil by means of concentrated sulfuric acid, the nature of which acid is not sufficiently elucidated, but which must very probably be considered as acid esters, possesses in an eminent degree the property of forming emulsions with water or of dissolving in the same, and such emulsions or solutions are capable of penetrating the wood-fiber down to the core. In this respect they are far superior to solutions of tar-oil in resinous soap, which has recently been utililized for this purpose and which on account of its strongly-basic nature has much difficulty in penetrating the wood-fiber. Moreover, the presence of these ester acids or resin-sulfuric esters in the said solution renders its antiseptic action so strong that even when diluted the said solution may be used advantageously for the impregnation of wood without materially reducing its preservative property. In this manner it is possible to effect a considerable saving of tar-oil, and thereby to reduce the cost of impregnation to such an extent that this material may be used even for telegragh-posts, which hitherto had to be impregnated with chlorid of zinc or sulfate of copper, because the consumption of tar-oil would have been too great.

The details of procedure for preparing a solution of tar-oil may be as follows: One hundred parts of crude or refined resin-oil are mixed with one hundred parts of concentrated sulfuric acid in a suitable agitator and at a low temperature. The resin-oil will thereby be dissolved in the sulfuric acid while liberating a small quantity of sulfurous acid, the result being an almost homogeneous mixture of acid sulfuric resin-esters (also called "resin-sulfuric esters" and "resin-sulfuric acids") and free sulfuric acid, which, however, splits up when a limited quantity of water is added. In this manner two layers are obtained—viz., a lower layer, consisting of dilute sulfuric acid, and an upper layer, which contains almost the whole of the ester acids together with some free sulfuric acid and any resin-oil which may have remained undissolved. The liquid is now heated for some time, thereby causing small quantities of acid to separate. The upper layer is neutralized by means of moderately-dilute soda or potash liquor, and water is added until the entire liquid amounts to about two hundred parts. The liquid, which is only slightly turbid, owing to the separation of small quantities of its constituents, is now mixed with an equal quantity of tar-oil, and sufficient water is added to obtain the desired degree of dilution for the impregnating liquid. A still more advantageous method consists in adding to the free ester acid before it is neutralized with alkali an equal or larger quantity of tar-oil. If a limited quantity of water is now added, the entire quantity of free sulfuric acid still contained in it separates out, so as to prevent any formation of alkali sulfates and consequently their injurious influence on the tar-oil solution. Subsequently the solution is neutralized and mixed with the desired quantity of water, the solution of tar-oil in an alkali salt of resin-sulfuric acid, obtained as described, being readily mixable with any quantity of water.

What I claim is—

1. The process for obtaining a solvent or diluent for tar-oil, which consists in dissolving resin-oil in sulfuric acid at a low temperature, thereby forming a mixture of acid esters with free sulfuric acid, subsequently adding water, thereby forming a lower layer consisting mainly of dilute sulfuric acid and an upper layer consisting mainly of the acid esters, and then separating the two layers, substantially as described.

2. The process for obtaining a solution or emulsion of tar-oil suitable for the impregnation of wood, which consists in dissolving the tar-oil in an alkali salt of resin-sulfuric acid, substantially as described.

3. The process for obtaining a solution or emulsion of tar-oil, suitable for the impregnation of wood, which consists in dissolving resin-oil in sulfuric acid, so as to obtain a mixture of resin sulfuric ester or resin sulfuric acid with free sulfuric acid, adding water to form a lower layer consisting of dilute sulfuric acid and an upper layer containing the resin sulfuric esters, separating the two layers, adding to the upper layer tar-oil, subsequently separating from the esters contained in the upper layer the remainder of free sulfuric acid by adding water, neutralizing the liquid by the addition of alkali, and adding sufficient water to obtain an impregnating liquid of the desired strength, substantially as described.

4. An impregnating liquid composed of tar-oil and an alkali salt of resin-sulfuric acids, substantially as described.

In testimony that I claim the foregoing as my invention I have signed my name in the presence of two subscribing witnesses.

JULIUS RÜTGERS.

Witnesses:
LUDWIG WERGHÖFFER,
HENRY HASPER.